(12) United States Patent
Ranganathan

(10) Patent No.: US 6,550,590 B1
(45) Date of Patent: Apr. 22, 2003

(54) DOUBLED VENTED COOLING VANE DISK BRAKE ROTOR

(75) Inventor: Srikanth Ranganathan, Novi, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/079,224

(22) Filed: Feb. 20, 2002

(51) Int. Cl.[7] .............................................. F16D 65/10
(52) U.S. Cl. ........................ 188/218 XL; 188/716; 188/264 A
(58) Field of Search ................. 188/71.5, 71.6, 188/218 XL, 264 A, 264 AA

(56) References Cited

U.S. PATENT DOCUMENTS

| | | | | |
|---|---|---|---|---|
| 4,132,294 A | * | 1/1979 | Poli ..................... | 188/218 XL |
| 4,903,801 A | * | 2/1990 | Kobelt ................. | 188/218 XL |
| 4,928,798 A | * | 5/1990 | Watson et al. ....... | 188/218 XL |
| 5,004,078 A | * | 4/1991 | Oono et al. ........... | 188/218 A |
| 6,273,223 B1 | * | 8/2001 | Aloy ...................... | 188/24.11 |
| 2002/0084250 A1 | * | 1/2001 | Chang .................. | 216/41 |

FOREIGN PATENT DOCUMENTS

| | | | | |
|---|---|---|---|---|
| DE | 3337710 | * | 4/1985 | ........... 188/218 XL |
| EP | 318687 | * | 10/1988 | ........... 188/218 XL |
| EP | 525415 | * | 6/1992 | ........... 188/218 XL |
| FR | 2561732 | * | 9/1985 | ........... 188/218 XL |
| GB | 2136921 | * | 9/1984 | ........... 188/218 XL |
| GB | 2172676 | * | 9/1986 | ........... 188/218 XL |
| WO | 94/02020 | * | 1/1995 | ........... 188/218 XL |

* cited by examiner

Primary Examiner—Christopher P. Schwartz
Assistant Examiner—Devon Kramer
(74) Attorney, Agent, or Firm—Laura C. Hargitt

(57) ABSTRACT

A brake rotor has double annular vents with cooling vanes connecting inboard and outboard cheeks of a rotor to a central support ring. Each of the annular vents provides separate passages for cooling the adjacent cheek of the brake rotor and separate inlets are provided for the dual vents from opposite sides of the central support ring. Aligned and staggered vane embodiments and parallel and angled passage embodiments are disclosed. The dual vents increase both the flow rate and the surface area for heat transmission and flow the air closer to the heated cheek surfaces. The staggered vanes improve stiffness and the slanted passages have potential stiffness and heat sink advantages.

9 Claims, 3 Drawing Sheets

DOUBLED VENTED COOLING VANE DISK BRAKE ROTOR

TECHNICAL FIELD

This invention relates to rotors for automotive vehicle disk brakes and, more particularly, to rotors having a double row of cooling vents.

BACKGROUND OF THE INVENTION

It is known in the art relating to automotive vehicle disk brakes to provide vented rotors having a single ring of air passages or cooling vents separated by annularly spaced cooling vanes. The vanes act as impellers that force air through the passages by centrifugal action during rotation of the brake rotor when the vehicle is moving. The vanes also connect the two cheeks of the rotor together and so affect the stiffness of the rotor by their structural characteristics. The air passing through the passages cools the brake rotor and the associated brake pads and thereby extends the life of the pads and improves the braking action of the pads against the rotor. A vented brake rotor has greater surface area per unit of mass of the rotor than an unvented rotor and has higher cooling rates due to both increased air velocity and increased surface area.

Two fundamental variables that influence the performance of a vehicle brake rotor are the cooling rate and the heating rate. The higher the cooling rate and the lower the heating rate the lower the braking temperature of a given rotor. Typically, the total width of a brake rotor will be fixed for a given vehicle in advance during the design and development of the vehicle. Increasing the air gap along the rotor axis will increase the cooling rate, however if the air gap along the axis is increased the cheek thickness will have to be reduced which brings down the mass of the rotor. The cooling rate and heating rate are opposing variables for a fixed rotor total width so that increasing one will decrease the other and vice versa. It is a problem then to find the optimum point where both cooling and heating rates are acceptable and rotor performance and pad wear life are maximized. Various changes, such as increasing the number of vanes, modifying vane shape or enhancing brake rotor and pad materials can affect the performance of a disk but may also adversely affect its structural and noise properties. Accordingly, improvements in the performance of the current version of a vented brake rotor generally represent compromises between performance and other required characteristics.

SUMMARY OF THE INVENTION

The present invention provides an improved brake rotor which provides a double row of vents with cooling vanes connecting inboard and outboard cheeks of a rotor to a central support ring. Each of the rows or rings of vents provides separate cooling to the adjacent cheek of the brake rotor and separate inlets are provided for the two rows of vents from opposite sides of the central support ring.

The double-vented brake rotor of the invention improves rotor performance in several ways. First, the surface area for heat transmission to the cooling air is increased by the introduction of two cheek faces connected to the central support ring. Second, the air flow rate is increased due to bifurcation of the air passages. Third, the flowing air is brought closer to the heat sources, which are the outer cheek faces. The result is that cooling performance of the new brake rotor is substantially improved. The design is such that the brake rotor is tangentially and axially rigid because the cooling vanes are relatively short and support the cheeks without substantial deflection, which leads to reduced noise propensity.

These and other features and advantages of the invention will be more fully understood from the following description of certain specific embodiments of the invention taken together with the accompanying drawings.

DESCRIPTION OF THE PREFERRED EMBODIMENT

Figure 1:
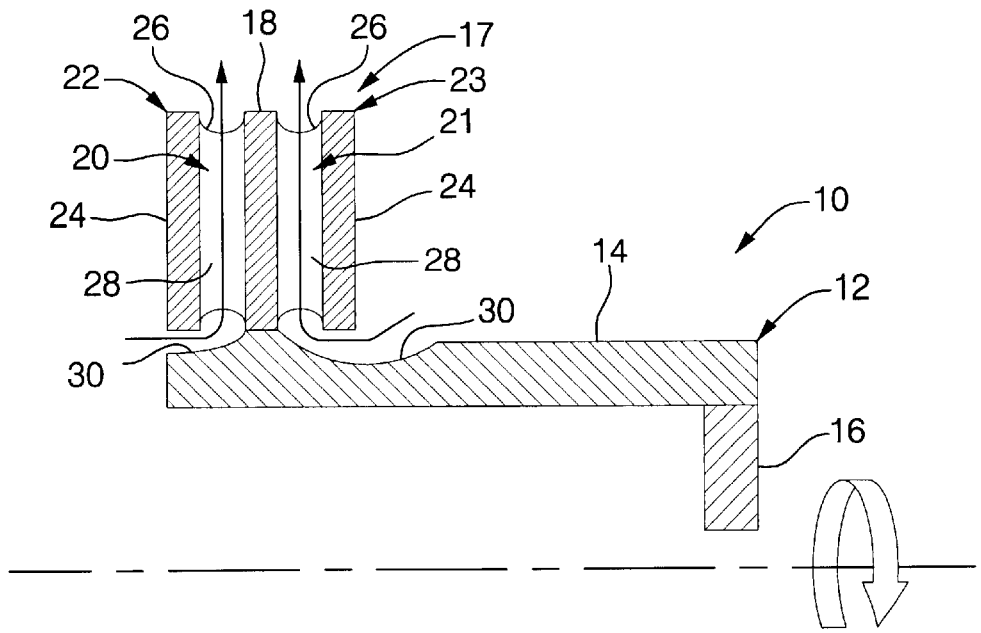
FIG. 1 is an axial half cross sectional view of a first embodiment of double vented brake rotor having aligned vanes.
Figure 2:
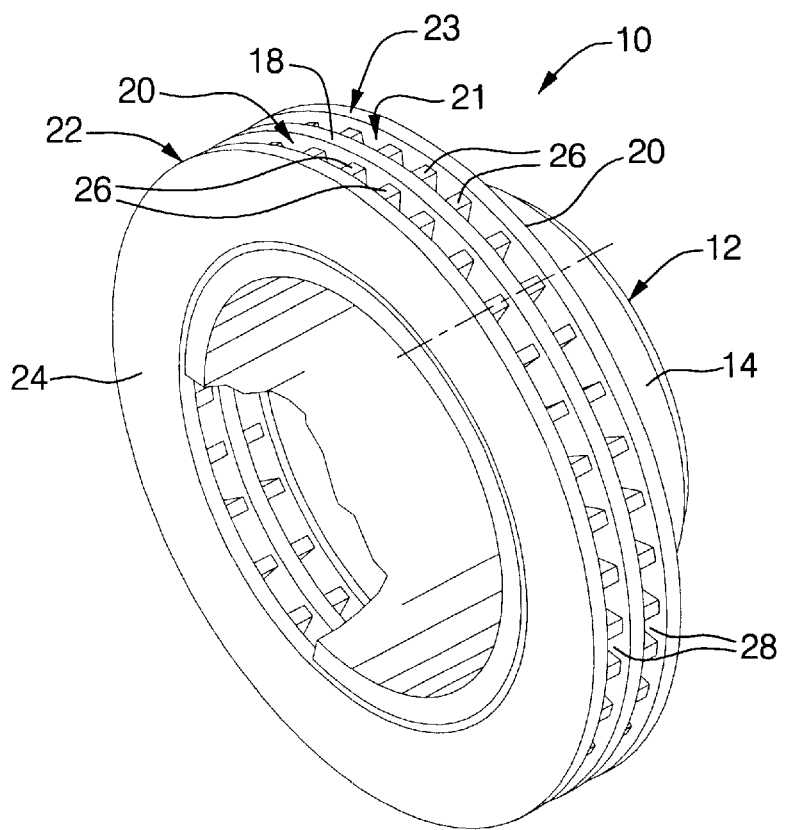
FIG. 2 is an isometric view showing the rotor of FIG. 1.

Referring first to FIGS. 1 and 2 of the drawings in detail, numeral 10 generally indicates a first embodiment of a double-vented brake rotor according to the invention. Rotor 10 includes a hub 12 having a generally cylindrical body 14 ending axially outwardly from a radially inwardly extending ring 16 having openings, not shown, for attachment of the hub to a wheel spindle of a vehicle. Adjacent its inner end, the hub 12 is connected with a radially outwardly extending central support ring 18.

An annular brake disk 17 is carried by the hub 12 at its inner end. The brake disk 17 includes a central support ring 18, which is fixed to the hub 12 and extends radially outward therefrom. The disk 17 further includes inboard and outboard cheeks 22 and 23 respectively, spaced to either side of the support ring 18 to form double inboard and outboard vents 20,21. The inboard and outboard cheeks 22, 23 have outer surfaces 24 adapted to be engaged by the brake pads of a disk brake mechanism not shown. Each cheek 22,23 is connected axially with the support ring 18 by a ring of angularly spaced vanes 26, which extend radially and axially to define a plurality of angularly spaced generally radial air passages 28 across the annular vents 20, 21. The passages 28 provide for radial air flow from the inner diameter to the outer diameter of the cheeks 22,23.

In the present instance, inlet air flow to the passages 28 is enhanced by shallow annular grooves or dents 30 provided in the cylindrical body 14 inward of the cheeks 22, 23. As indicated in drawing FIGS. 1 and 2, the vanes 26 of the inboard vent 20 are axially aligned with the corresponding vanes of the outboard vent 21.

Figure 3:
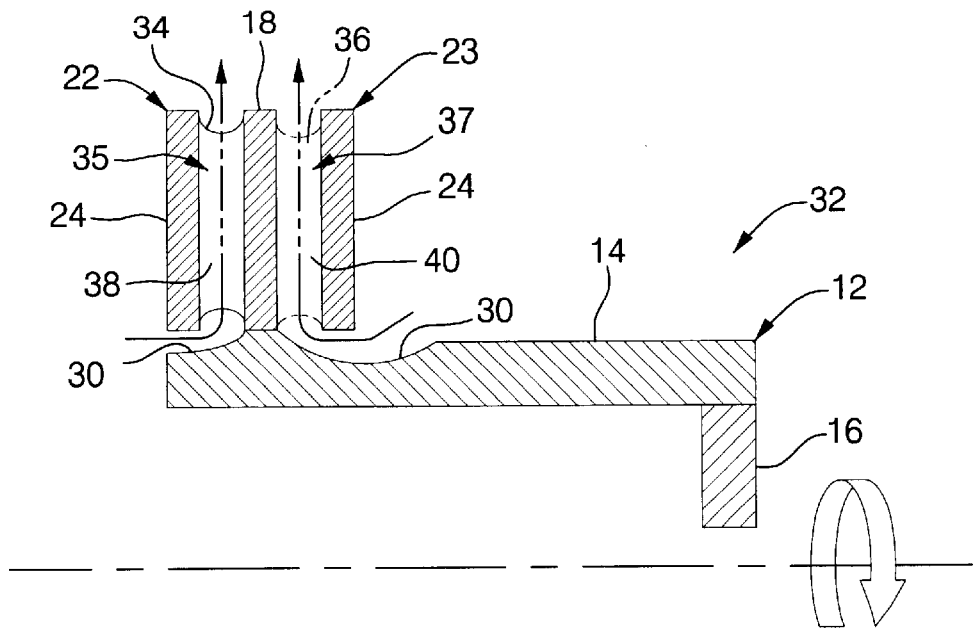
FIG. 3 is a view similar to FIG. 1 but showing an alternative embodiment wherein the vanes of one of the vents are angularly staggered relative to the other.
Figure 4:
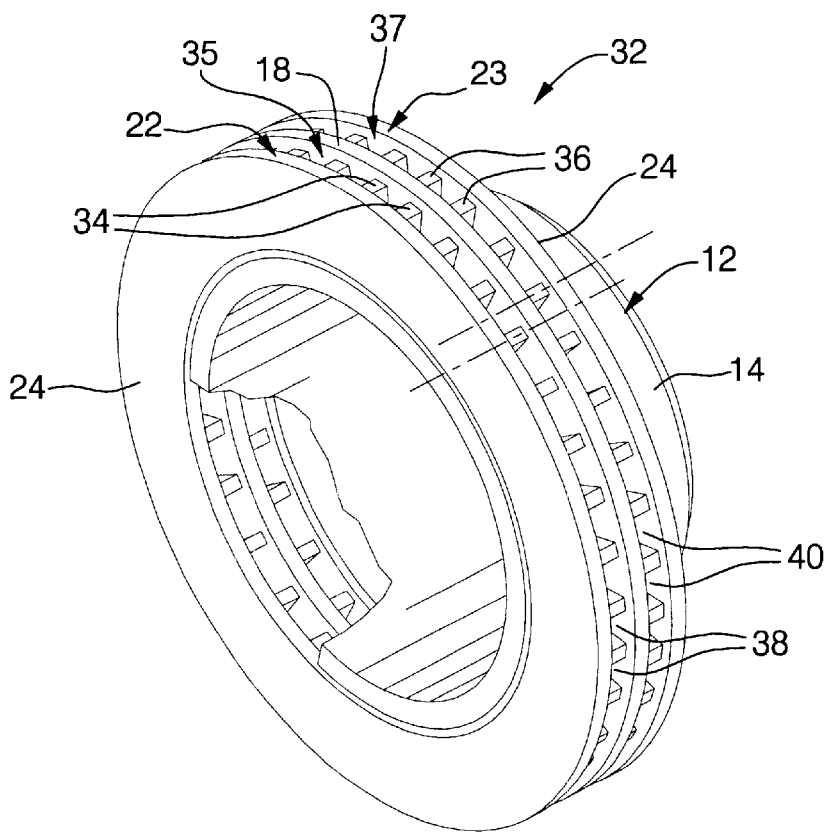
FIG. 4 is an isometric view showing the embodiment of FIG. 3.

Referring now to FIGS. 3 and 4 of the drawings, numeral 32 generally indicates a second embodiment of double-vented brake rotor according to the invention. Rotor 32 is in many respects identical to rotor 10 so that like numerals are used to indicate like parts.

Rotor 32 differs from rotor 10 in that the vanes 34 of the inboard vent 35 are angularly staggered fully out of alignment with the vanes 36 of the outboard vent 37, so that the inboard and outboard passages 38, 40 are similarly staggered. Optionally, in modified embodiments, the amount of stagger in the vanes of the dual vents may be varied as desired from a minimal misalignment to full misalignment. Also, the particular configuration of the vanes may take any desired form and may be curved radially or axially if desired for use in either embodiment of the invention as previously described. Further, the vanes of the two vents could be made to differ in size, shape number and/or spacing should such modifications be found to be advantageous.

Figure 5:
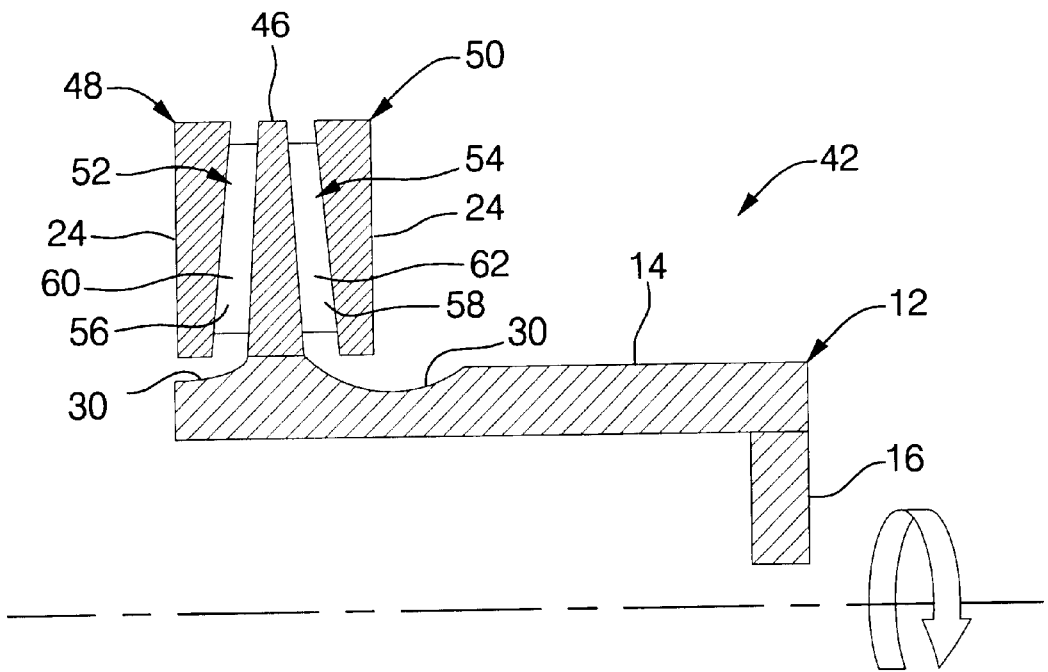
FIG. 5 is a view similar to FIG. 1 showing a third embodiment wherein the vents are slanted inwardly toward their outer radius.
Figure 6:
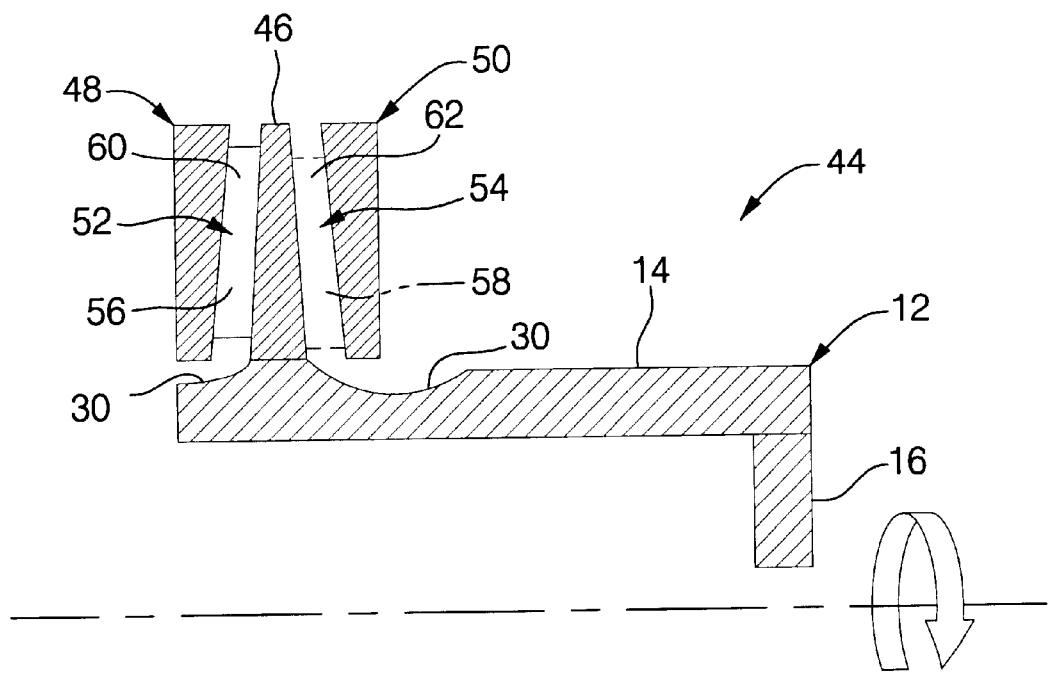
FIG. 6 is a view similar to FIG. 5 showing an alternative embodiment with angularly staggered vanes.

FIG. 5 of the drawings illustrates a third embodiment of brake rotor indicated by numeral 42 and FIG. 6 of the drawings indicates a fourth embodiment of brake rotor indicated by numeral 44. Both the third and fourth embodiments 42, 44 are similar to the previously described rotors 10, 32 in being provided with a hub 12, cylindrical body 14 and a radially inwardly projecting ring 16, the body including shallow annular grooves or dents 30 similar to those of the first described embodiments. Rotors 42, 44 differ from the previous embodiments in that the central support ring 46 and the inboard and outboard cheeks 48, 50 are configured to provide annular vents 52, 54 which are slanted toward one another as their radial distance from the inner diameter to the outer diameter of the cheeks increases. Thus the thickness of the central support ring is reduced toward the outer diameter while the thickness of the respective cheeks is increased toward their outer diameters. The result is that the vanes 56, 58 and the cooling passages 60, 62 slant toward one another as the passages extend radially outward to their outer diameters.

The embodiments of FIGS. 5 and 6 differ from one another in the same manner as those of the first two described embodiments, namely, in that the vanes 56, 58 of rotor 42 of FIG. 5 are aligned longitudinally with the corresponding vanes of the adjacent passages and the vanes 56, 58 of rotor 44 are staggered radially out of alignment with one another. The optional variations noted regarding the embodiments of FIGS. 1–4 could also be applied to the embodiments of FIGS. 5 and 6.

In operation of all the embodiments described, rotation of the rotor as the vehicle moves causes the vanes of the various embodiments to act as impellers which, through centrifugal action, cause air to flow radially outward through the respective passages adjacent to the inboard and outboard cheeks of the respective brake rotors. The air passing through the passages cools the cheeks of the rotors, the inboard ring of passages cooling the inboard cheek of the rotor and the outboard ring of passages cooling the outboard cheek of the rotor.

In all cases the additional air flow generated in the dual passages provides improved cooling of the separate cheeks of the respective rotors so that the temperature of the cheeks caused by the friction of braking is maintained at a generally lower level. This occurs in part because the thickness of the cheeks is reduced so that air flow passes closer to the sources of heat which are the outer surfaces 24 of the cheeks. At the same time the reduced mass of the cheeks allows them to be cooled more quickly when the braking action ceases so that the temperature is maintained at a lower level both during and after braking. Additionally, heat from the inner and outer cheeks is conducted through the vanes into the central support ring and is dissipated to the air flow from the ring surface. All these actions combine to maintain lower temperatures in brake rotors made according to the invention.

Staggering of the vanes, as opposed to providing aligned vanes as in the first and third embodiments, appears to provide increased structural rigidity in the brake rotor and therefore to reduce vibration and noise in these embodiments, although this may vary with the extent of angular staggering or other variations not yet evaluated.

The slanted vanes and passages of rotors 42 and 44 shown in FIGS. 5 and 6 provide the additional advantage that the cheeks are tapered so they are thicker at their outer edges than at their inner edges and thus provide a greater local mass as the distance toward their outer diameter increases. This provides a greater heat sink for receiving the heat input from rubbing of the brake pads at the outer diameter where the linear speed of the surfaces 24 is greater so that the heat input is greater than at the inner edges of the cheeks. Thus the temperature rise at the outer periphery is smaller during heat input while the air passages still provide increased cooling for carrying away the heat in the inboard and outboard passages which directly cool the inboard and outboard cheeks.

A further advantage is that the central support ring 46 is larger at its base and thus provides increased structural support for the cheeks and the associated vanes which are connected to the support ring. In addition, the embodiment of FIG. 6 having the staggered vanes has the potential of being stiffer structurally than the embodiment of FIG. 5 having aligned vanes.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A disk brake rotor for an automotive vehicle, the rotor having a hub rotatable on an axis, an annular brake disk carried by the hub, the disk including a central support ring fixed to the hub, and inboard and outboard cheeks each connected across annular vents by a ring of angularly spaced vanes extending from inner to outer edges of the disk and defining a plurality of angularly spaced generally radial air passages between the cheeks and the support ring and extending from the inner to outer edges of the disk.

2. A disk brake rotor as in claim 1 wherein the hub has a generally cylindrical exterior connected with the support ring and includes an annular recess in the hub exterior and radially inward of one of the cheeks to form an enlarged passage for cooling air passing into an adjacent ring of the angularly spaced air passages.

3. A disk brake rotor as in claim 1 wherein there are annular recesses in the hub exterior and radially inward of both cheeks for passing cooling air to the angularly spaced air passages adjacent both cheeks.

4. A disk brake rotor as in claim 1 wherein the vanes adjacent the inboard cheek are angularly offset from the vanes adjacent the outboard cheek.

5. A disk brake rotor as in claim 1 wherein the angularly spaced air passages adjacent opposite sides of the central support ring are slanted toward one another from the inner to the radially outer edges of the disk, such that the radially outer edges of the cheeks are axially thicker than the inner edges and the radially outer edge of the support ring is thinner than the inner edge.

6. A disk brake rotor as in claim 5 wherein the vanes adjacent the inboard cheek are angularly offset from the vanes adjacent the outboard cheek.

7. A disk brake rotor as in claim 3 wherein the angularly spaced air passages adjacent opposite sides of the central support ring are slanted toward one another from the inner to the radially outer edges of the disk, such that the radially outer edges of the cheeks are axially thicker than the inner edges and the radially outer edge of the support ring is thinner than the inner edge.

8. A disk brake rotor as in claim 7 wherein the vanes adjacent the inboard cheek are angularly offset from the vanes adjacent the outboard cheek.

9. A disk brake rotor as in claim 3 wherein the vanes adjacent the inboard cheek are angularly offset from the vanes adjacent the outboard cheek.

* * * * *